United States Patent [19]

Ressmeyer et al.

[11] Patent Number: 5,371,939
[45] Date of Patent: Dec. 13, 1994

[54] HEAD LOCATOR FOR MOUNTING A HEAD TO A GIMBAL

[75] Inventors: James J. Ressmeyer, Apple Valley; Lloyd C. Goss, Bloomington, both of Minn.

[73] Assignee: Martronics, Inc., Burnsville, Minn.

[21] Appl. No.: 88,868

[22] Filed: Jul. 8, 1993

[51] Int. Cl.[5] .............................................. G11B 5/105
[52] U.S. Cl. ..................................... 29/603; 360/104; 360/109; 156/64
[58] Field of Search ................. 360/75, 104, 105, 103, 360/109; 29/603; 156/64

[56] References Cited

U.S. PATENT DOCUMENTS

| 3,510,374 | 5/1970 | Walker | 156/64 |
| 4,866,836 | 9/1989 | Von Brandt | 29/603 |
| 5,225,950 | 7/1993 | Crane | 360/104 |

Primary Examiner—Aristotelis Psitos
Assistant Examiner—James T. Wilson
Attorney, Agent, or Firm—Patterson & Keough

[57] ABSTRACT

In positioning a transducer head with respect to a supporting arm, the transducer head is subject to both a normal force and a moment force and has first and second air bearing surfaces. The apparatus includes a controller and first and second sensors for detecting the overturning moment and being adapted for providing data representative of the overturning moment to the controller. A first actuator varies the position of the load arm and a second actuator varies the position of the transducer head. The first and second actuators act in concert to negate the overturning moment. A third sensor detects the position of the first air bearing surface with respect to a known level reference and a third actuator positions the first air bearing surface of the transducer head. A fourth sensor detects the position of the second air bearing surface with respect to a known level reference and a fourth actuator positions the second air bearing surface of the transducer head. The controller calculates total normal force and differential force loads on the air bearing surfaces and generates commands to the first and second actuators to position the transducer head responsive to the calculated forces to achieve a desired differential force loading on the first and second air bearing surfaces after the head is glued to the load arm.

6 Claims, 7 Drawing Sheets

HEAD LOCATOR FOR MOUNTING A HEAD TO A GIMBAL

TECHNICAL FIELD

The present invention relates to the head gimbal assembly utilized to read and write data on a magnetic coated hard disc. More particularly, it relates to a device for accurately positioning the read/write head on the gimbal prior to gluing the read/write head to the gimbal in order to improve the flight characteristics of the read/write head over the disc.

BACKGROUND OF THE INVENTION

The method of retrieving data from a magnetic coated hard disc and putting new data on the disc has certain parallels to the way a record player functions. Like the record played on a record player, the disc rotates at relatively high speed about a central axis. An arm, like the tone arm of the record player, is positioned above the spinning disc to retrieve data off the disc. Unlike the record player, this arm can also put new data on the disc as well as retrieve it.

The arm is called a head gimbal assembly and consists of three components: the load arm, the gimbal and the read/write head. Additionally, connecting leads (not shown) are attached to the read/write head and are routed along the top of the load arm. These leads are retained in place typically by small clips formed in the upper side of the load arm. The load arm is a suspension device usually constructed of metal that is approximately one inch long. The load arm both supports the read/write head and applies a downward force on the read/write head. The gimbal is a moveable attaching device that attaches the read/write head to the load arm. The gimbal permits the read/write head to move in both pitch and in roll as the read/write head moves across the disc.

When viewed end on, the read/write head has two spaced apart lands separated by a groove. When positioned on the load arm, the two lands are oriented tangential to a circle having its origin at the center of the disc. The inner land is located radially nearer to the center of the disc than the outer land. The active portion of the read/write head that actually does the data retrieval and imposition of new data on the disc is located is formed integral to the outer land on the surface of the land that is closest to the disc. This surface is called an air bearing surface.

When the disc is not in operation, the read/write head is resting on the disc in response to the force imposed by the load arm. When the disc is brought into rotating motion, the read/write head is lifted off the surface of the disc by a stream of air known as an air bearing. The force of the air bearing counters the force of the load arm and the read/write head actually flies over the surface of the disc and is subject to many of the same aerodynamic forces that an aircraft is when in flight. For accurate data retrieval and imposition, it is very important that the read/write head flies very accurately over the disc. Precisely locating the read/write head with respect to the gimbal at the time that the read/write head is adhesively bonded to the gimbal is a major factor in ensuring the accurate flight characteristics of the read/write head.

There is a present problem of properly locating and adhesive bonding the Load Arm Gimbal to the read/write head. At present, flying heights between the air bearing surfaces of the read/write head and the magnetic disc surface are approaching $5\mu$ inch spacing. Manufacturing tolerances in the Load Arm Gimbal assembly and lack of optimum positioning of the read/write head cause unwanted errors in flying height of finished HGA assemblies. This greatly diminishes the yield rate of finished HGA's. Additionally, since the surface velocity over the rotating disc at a given radius of the disc is greater than the surface velocity over the disc at a lesser radius, the outer land of the read/write head sees a greater surface velocity than the inner land. This greater speed increases the aerodynamic lift on the underside of outer land, known as an air bearing surface (ABS). This greater speed caused the outer ABS to fly higher above the disc surface than the inner ABS as a result of an increased aerodynamic lift.

As previously indicated, the active read/write magnetic transducer is located on the outer air bearing surface of the read/write head. This is desirable in order to use the largest disc surface available for read/write recording and to optimize the amount of recorded data on the disc. It is also desirable to have the active transducer, and thus its supporting ABS, fly at a height equal to or lower than the inactive inner ABS. Offsetting the gimbal toward the outer ABS prior to bonding the read/write head to the gimbal will cause the outer ABS to fly lower and the inner ABS to fly higher. This must be very accurately done to achieve the desired result.

Another present source of error in the production of HGA's is the fact that the underside surface of the load arm to which the gimbal is attached may not be exactly coplanar with the upper surface of the read/write head where the read/write head is bonded to the gimbal. Manufacturing tolerances on coplanarity between the load arm mounting surface and the gimbal to read/write head interface surface are currently 0.5° to 1°. While such angular difference is relatively small, this tolerance causes additional variation of differential flying height between the two air bearing surfaces.

Present industry convention defines positive direction differential flying height or roll as the outer ABS flying lower than the inner ABS. To ensure the proper flight height and roll, each ABS must be instrumented to measure the vertical load and the load on each ABS will necessarily be different at the time that the read/write head is bonded to the gimbal. The measuring devices must be able to accurately measure very small loads on the order of 2.0 gm, to an accuracy and resolution of 50 milligrams.

The current method of instrumenting the ABS loads is through the use of a load cell that measures only tile total downward force on both ABS taken together. No current system measures the differential gram loading on each ABS. Effectively the current method of positioning the head with respect to the load arms to determine that on the average, the head should be, for example, 2.5 mils right of center on the load arm. The current systems are capable of very accurately positioning the head in that position on the load arm. The problem is that the position is only an estimate of where the head should actually be positioned in order to provide the optimum performance.

A further disadvantage of load cell systems stems from the deflection of a load cell under load, especially when a differential load on each ABS is required for accurate positioning. The load cells tend to form a plane which is at an angle with the load arm mounting base and thereby introduce an angular error which will reduce the accuracy of the measurement.

Another disadvantage of load cell use occurs from the inability of the load cells to measure an overturning moment. An overturning moment occurs due to unrelaxed friction between the gimbal and the upper surface of the read/write head that results from moving the read/write to the desired position beneath the gimbal and from torquing moments applied to the load arm at its point of mounting in the head gimbal locator device. A side force due to an unrelaxed frictional force and the torquing moments will result in an overturning moment. The side force acts on the read/write head in such a manner as to attempt to rotate the read/write head in either a clockwise or counterclockwise direction. This rotational force will be measured as an increase in the downward force on one ABS and decrease in the downward force on the other ABS depending on whether the rotational force is operating in a clockwise or a counterclockwise direction.

As indicated, the current devices used for measuring the force on the two air bearing surfaces of the read/write head read only the total gram loading as distinct from the present invention that reads both the total gram loading and the differential gram loading on each ABS. The current devices and are therefor prone to error. This error is necessarily reflected in the positioning of the read/write head with respect to the gimbal prior to bonding and results in ultimately mispositioning the read/write head on the gimbal and thereby causing poor flight characteristics of the read/write head.

The read/write head is a very small device and, in keeping with the trends in the electronics industry, successive generations of read/write heads keep getting smaller. This trend intensifies the need to more accurately position the head on the load arm. Accordingly, it would be a decided advantage in the disc file industry to have a head gimbal locator that would accurately measure differential loads on the two air bearing surfaces of the read/write head and accurately position the read/write head with respect to the load arm and gimbal to achieve a desired differential loading of the ABS's in order to ensure the desired flight height of the read/write head when the read/write head is in operation with a rotating disc.

SUMMARY OF THE INVENTION

The apparatus of this invention provides accurate measurement of the differential forces on the two air bearing surfaces and provides an automatic positioning of the gimbal on the read/write head to obtain the desired differential forces. The present invention employs a unique system of force balance, closed loop, servo controlled, positioning and measuring mechanisms. In principle a force balance system measures the force required to return a surface to its original position when a change in force is applied to the surface. A linear variable differential transformer (LVDT) type electromechanical positioning transducer or equivalent device is employed to measure displacement from a reference position. This application of LVDT requires very small transducers to detect movement in the micro-inch range. These LVDT are therefore low inductance devices requiring a high-frequency drive signal. A phase sensitive LVDT demodulator circuit is used. This circuit produces a phase reversal to generate a bipolar signal around the zero set point.

A linear voice coil type electromechanical force actuator is employed to return the surface to the original position when the load on the surface changes. The force versus current gain coefficient of a correctly designed voice coil actuator is extremely accurate over a wide force range, especially when the voice coil in the magnetic field is always returned to its original position when the load changes. The linearity of the voice coil is expressed in the relationship of $F=K\beta li$. In this relationship, $F$=resulting force, $K$=numerical constant for system of units, $\beta$=airgap flux density, $l$=active wire length, and $i$=coil current.

Both the position transducer and the voice coil actuator are non contact devices and thus have zero friction and hysteresis forces to cause measurement and position errors. The permanent magnets of the position transducer and the voice coil actuator are preferably constructed of sumarium cobalt. Sumarium cobalt is a rare earth material that is highly coercive, generates high energy and also has a very low temperature coefficient. These characteristics permit the fabrication of an accurate, stable, and repeatable measuring system.

The third element in this invention is the closed loop servo control system which returns the measuring surface to its original position when the applied load changes. A closed loop servo control system permits controlled output motion of the reference surfaces during measurement and positioning of the read/write head. A closed loop servo control system also permits returning to neutral positions not in contact with the read/write head before and after measurement of the differential gram forces on the read/write head. This permits rapid sequential processing of a large number of number of head gimbal assemblies. The closed loop servo control further allows use of a damped dither signal to reduce frictional force between gimbal and read/write head top surface and at the load arm support mounting to near zero.

The position transducers and voice coil transducers are mounted on linear flexures of high quality spring material which produces very low hysteresis and zero friction errors. Also employed is system of four position transducer to measure normal loads on each ABS, overturning moment, and gimbal to read/write head position. Coupled with this are four voice coil actuators. Two of which measure the normal ABS force and two which couple to position the Gimbal location on the read/write head to obtain the desired differential gram loading forces on the two air bearing surfaces.

DETAILED DESCRIPTION OF THE DRAWINGS

Figure 1:
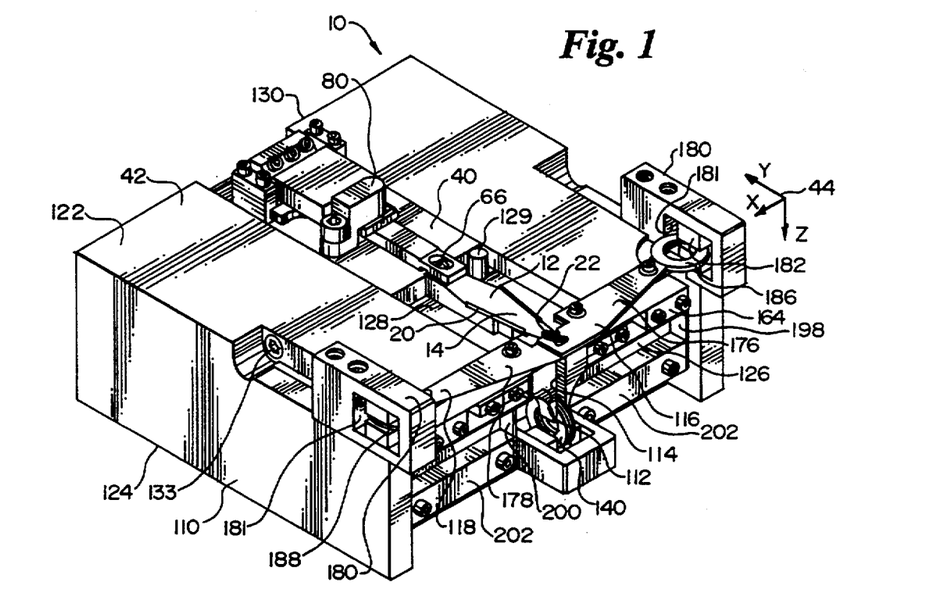
FIG. 1 is a perspective view of the carrier and base unit of the head gimbal locator of the present invention.
Figure 2:
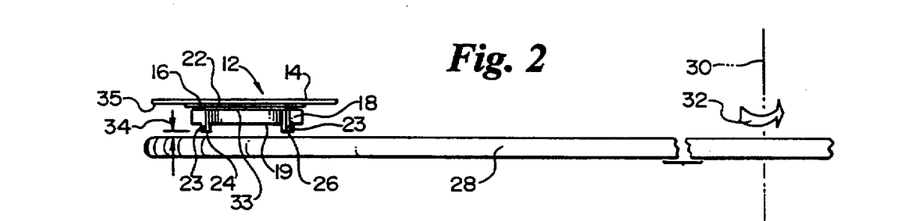
FIG. 2 is a front elevational view of the load arm, gimbal, and the head positioned in the flying position above a disc.

The head gimbal locator (HGL) of the present invention is shown generally at 10 in FIG. 1. The HGL is utilized in the construction of a head gimbal assembly (HGA) 12. The head gimbal assembly 12 is depicted in perspective in FIG. 1 with a closeup view of the tip portion depicted in FIGS. 2 and 3. As depicted in FIG. 2, the HGA 12 is comprised of load arm 14, gimbal 16, and head 18. Load arm 14 is a relatively long metallic arm designed to support gimbal 16 and head 18 as well as to apply a selected down force on head 18. Accordingly, load arm 14 is relatively stiff, but acts as a spring having a certain amount of up and down play. In a preferred embodiment, load arm 14 has upturned edges 20 that provide a stiffening effect to load arm 14.

Gimbal 16 and head 18 are exceedingly small devices located on the underside of tip 22 of load arm 14 as depicted in FIG. 1. FIG. 2 depicts tip 22 of load arm 14. Gimbal 16 is shown bonded between the underside of load arm 14 and the upper side of head 18. It is understood that gimbal 16 may be formed integral to the underside of load arm 14 as by the etching of load arm 14. Gimbal 16 is a flexible device designed to permit head 18 to move in both the pitch and roll axes with respect to load arm 14 responsive to external forces.

Head 18 is a read/write head utilized for applying data to a hard disc and retrieving data from a hard disc. Head 18 has a relatively broad central groove 19 flanked by two downward projecting lands 23, each such land 23 having an air bearing surface 24, 26. The active transducer that actually does the read/write function is not shown, but is located in the underside of air bearing surface 24. Typically, the transducer is located at the rear of air bearing surface 24. Air bearing surface 24 is designed to be positioned closest to the outer edge of the hard disc 28 when head gimbal assembly 12 is positioned within a disc drive or the like. This permits utilizing the maximum area of disc 28 for read/write functions. The active transducer is typically an inductive pickup coil that is formed integral to air bearing surface 24. Typically, the active transducer is formed in the rear portion of air bearing surface 24.

Head gimbal assembly 12 is shown in FIG. 2 positioned above disc 28. The size of head gimbal assembly 12 with respect to disc 28 is exaggerated in order to show more clearly the positioning of head gimbal assembly 12. The central axis of rotation of disc 28 is shown at 30 and the direction of rotation is shown by arrow 32. In operation, head gimbal assembly 12 rests on the surface of disc 28 while disc 28 is not rotating. Head 18 is held on the surface of disc 28 by a downward force generated by load arm 14. At the time disc 28 is brought into rotational motion, an air bearing (not shown) is energized. The air bearing provides a flow of air that causes head 18 to literally fly above the rotating disc 28. The air of the air bearing counters the downward force imposed on head 18 by load arm 14. In a preferred embodiment, this downward force generated by load arm 14 is approximately 5 grams. Flight height of head 18 above disc 28 as shown by arrows 34. In current applications, the flight height approaches five microinches.

Flight height 34 is a critical parameter in determining the performance of head gimbal assembly 12. It is desirable to have the active transducer in air bearing surface 24 fly at a slightly lower height than air bearing surface 26 with respect to disc 28. It is possible to achieve this difference in flight height by off setting the gimbal 16 toward air bearing surface 24. Additionally, to ensure the desired flight height 34, the upper surface 33 of head 18 and the lower surface 35 of load arm 14 must be coplanar. Current manufacturing tolerances allow for a plus and minus one degree error in the two surfaces 33, 35 from being exactly coplanar. This error causes an additional variation in the differential flying height between air bearing surface 24 and air bearing surface 26.

Figure 3:
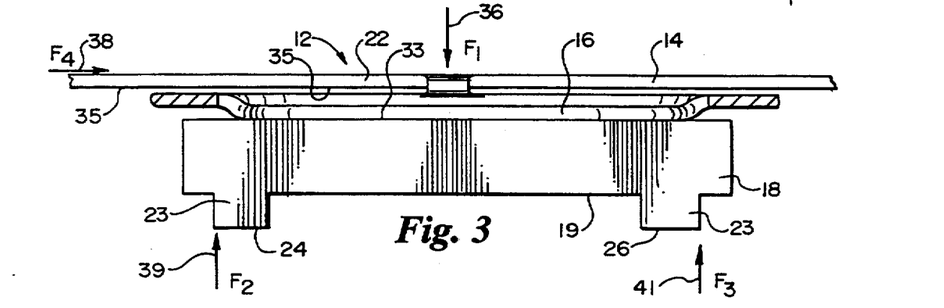
FIG. 3 is an enlarged front elevational view of the load arm, gimbal, and the head and the forces affecting the load arm, gimbal, and the head.

Positioning head 18 with respect to load arm 14 to achieve the desired flight height 34 is uniquely done by differential force balance techniques. Referring to FIG. 3, two external forces affect flight height 34. The first force, labeled F1 and shown by arrow 36 is the downward force imposed by load arm 14 on head 18. As previously indicated, this force, in a preferred embodiment, is approximately 5 grams. The second force is an over turning moment force labeled F4 and shown at 38. F4 is depicted as acting from left to right in FIG. 3. It is understood, however, that F4 can alternatively act from right to left. Over turning force F4 is a force that may be induced by a slight bend in load arm 14, by friction that exists between gimbal 16 and load arm 14 when gimbal 16 is adhesively bonded to load arm 14, or by friction that occurs at the point of mounting load arm 14 to head gimbal locator 10. Over turning moment force 38 tends to rotate head 18. As depicted in FIG. 3, this rotational force acting upon head 18 would tend to increase the downward force on air bearing surface 26 while decreasing the downward force on air bearing surface 24.

Upwardly directed force F2, labelled 39, acting upon air bearing surface 24, and upwardly directed force F3, labelled 41, acting upon air bearing surface 26, counter forces F1 and F4. By accurately determining the sum of forces F1 and F2 and the differential between force F2 and F3, the amount of roll of head 18 is determined. The desired flight height 34 of head 18 can be achieved knowing the roll induced in head 18. Head gimbal locator 10 orients load arm 14 with respect to gimbal 16 to achieve the desired differential force between force F2 and F3.

The head gimbal locator 10 is designed to accurately position head 18 and gimbal 16 with respect to load arm 14 prior to adhesively bonding to load arm 14. This accurate positioning permits achieving the desired force differential between forces F2 and F3. Head gimbal locator 10 has two main subcomponents: carrier 40 and base unit 42. Referring to FIG. 1, the X, Y and Z directions are as indicated by the referenced diagram 44. The carrier 40 functions to accurately position the head gimbal assembly 12 in the Y and Z dimensions and base unit 42 functions to position the head gimbal assembly 12 in the X dimension in order to achieve the proper position of head 18 with respect to gimbal 16 prior to adhesive bonding.

Figure 6:
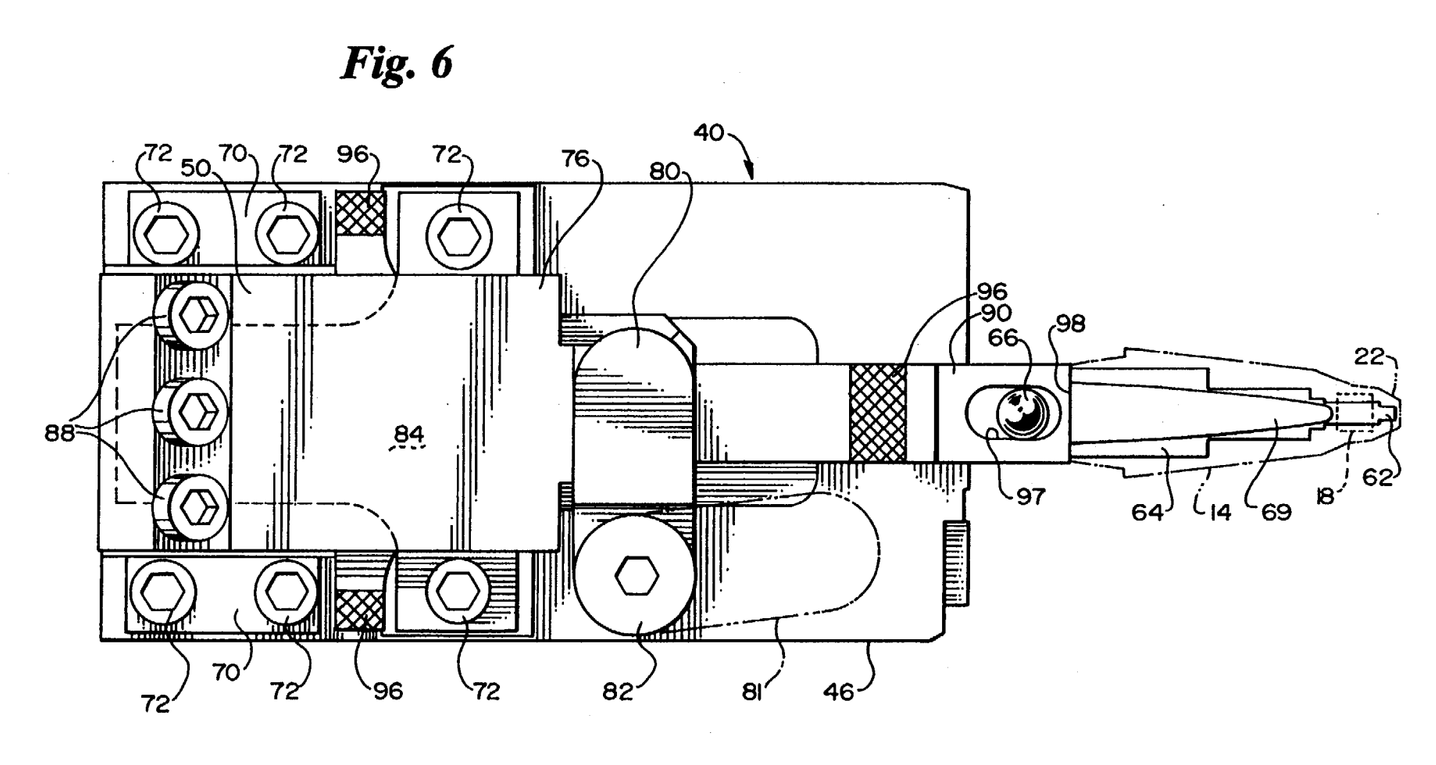
FIG. 6 is a top perspective of the carrier with the load arm and read/write head shown in phantom.
Figure 7:
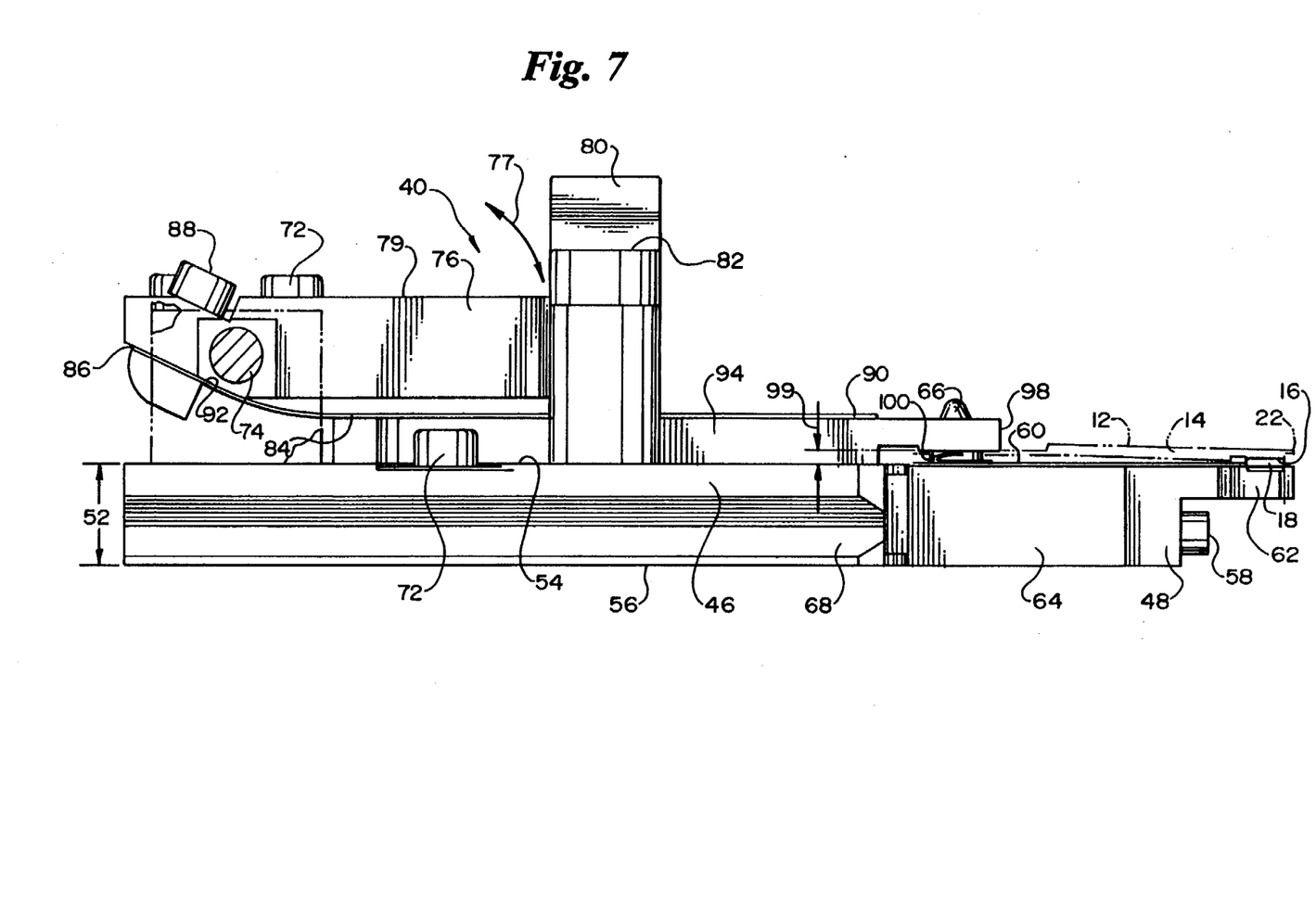
FIG. 7 is a side perspective of the carrier with the load arm and read/write head shown in phantom.

Referring to FIGS. 6 and 7, the carrier 40 is comprised of three main components; carrier base 46, nose piece 48 and clamping mechanism 50. Head gimbal assembly 12 is depicted in phantom to better illustrate the relationship of HGA 12 to carrier 40. Carrier base 46 is a finely machined metallic block that provides support for nose piece 48 and clamping mechanism 50. Carrier base 46 additionally establishes the Z height datum 52, which is the height dimension of carrier base 46. To maintain the accurate Z height datum, top surface 54 and bottom surface 56 of carrier base 46 are machined to close tolerances to ensure that top surface 54 and bottom surface 56 are virtually parallel.

Carrier base 46 is preferably generally rectangular shaped in plan form, with a projection 64 designed to mate with nose piece 48. An upwardly projecting load arm locating pin 66 is affixed to top surface 54 of projection 64. Load arm locating pin 66 is preferably bullet shaped and is held affixed to projection 64 by an upwardly projecting bolt (not shown) that threads in the base of pin 66. V-shaped grooves 68 are formed in both sides of carrier base 46, extending in the Y direction from the front to the rear of the rectangular portion of carrier base 46.

Nose piece 48 is preferably an L shaped machined metallic or ceramic bracket. Nose piece 48 is affixed to carrier base 46 by bolt 58. When mounted to carrier base 46, top surface 60 of nose piece 48 is coplanar with top surface 54 of carrier base 46. This ensures that the top surface 60 of nose piece 48 is at the Z height datum established by top surface 54 of carrier base 46. The upper arm 62 of nose piece 48 gradually tapers as it extends away from carrier base 46 in the Y direction, such that at its furthest extension, upper arm 62 becomes very narrow to support head 18 at tip 22 of load arm 14. Nose piece 48 is preferably constructed of hard coat anodized aluminum or ceramic material.

Clamping mechanism 50 includes two spaced apart lever pivot blocks 70. Lever pivot blocks 70 are affixed by bolts 72 to the upper surface of carrier base 46. Lever pivot blocks 70 are located at the opposite end of carrier base 46 from projection 64.

A pivot rod 74 is disposed between lever pivot blocks 70. Pivot rod 74 is a hinge pin. Clamp lever 76 has a bore 78 that encompasses pivot rod 74. Clamp lever 76 is bonded to pivot rod 74 and both rotate in a plane normal to upper surface 54 of carrier base 46, as indicated by arrow 77. Clamp lever 76 rotates between an open or loading position in which clamp lever 76 projects upward from carrier base 46 to a closed or loaded position in which upper surface 79 of clamp lever 76 is generally parallel with top surface 54 of carrier base 46.

A bridged clamp lever retainer 80 is rotatably affixed to upper surface 54 carrier base 46. Clamp lever retainer 80 rotates in a plane parallel to upper surface 54 of carrier base 46 about bolt 82. Clamp lever retainer 80 rotates between an open position, shown in phantom at 81, and the closed position as shown. In its open position, clamp lever retainer 80 permits clamp lever 76 to rotate freely between its unloaded and loaded positions. When clamp lever 76 is in its loaded position, clamp lever retainer 80 is rotated to its closed position. Clamp lever retainer 80 exerts a downward force, retaining clamp lever 76 in the loaded position.

A clamp spring 84 has a first end 86 that is firmly secured rearward of pivot rod 74. In the preferred embodiment, first end 86 is securely held in position by three bolts 88. Bolts 88 are mounted at an angle to the vertical such that first end 86 is clamped at an angle to the horizontal, thereby biasing second end 90 of clamp spring 84 in the downward direction. Clamp spring 84 is routed beneath pivot rod 74 and extends forward beneath clamp lever 76. Clamp lever 76 has a bearing face 92 that is in contact with the upper side of clamp spring 84. When clamp lever 76 is in its loaded position, bearing face 92 bears on clamp spring 84 and biases clamp spring 84 in a downward direction.

A Z height spacer 94 is interposed between the underside of clamp spring 84 and top surface 54 of carrier base 46. In plan form, Z height spacer 94 is generally funnel shaped, with three points of contact with top surface 54 of carrier base 46 at contact pads 96. Z height spacer 94 extends beneath clamp lever retainer 80 with its broad base rearward approximate pivot rods 74 and slender nose 98 projecting forward. Nose 98 has an aperture 97 therethrough that is race track shaped and designed to fit over load arm locating pin 66. When so positioned, a space is left between the underside of nose 98 and the top surface 54 of carrier base 46. This space, indicated at 99, sets the Z height of the load arm assembly 12. Clamp spring 84 exerts a downward force on Z height spacer 94 forcing Z height spacer 94 into contact with carrier base 46 at contact pads 96. Load arm clamp spring 100 is positioned between upper surface 60 of nose piece 48 and the underside of load arm 14, exerting an upwardly directed force on load arm 14.

Figure 4:
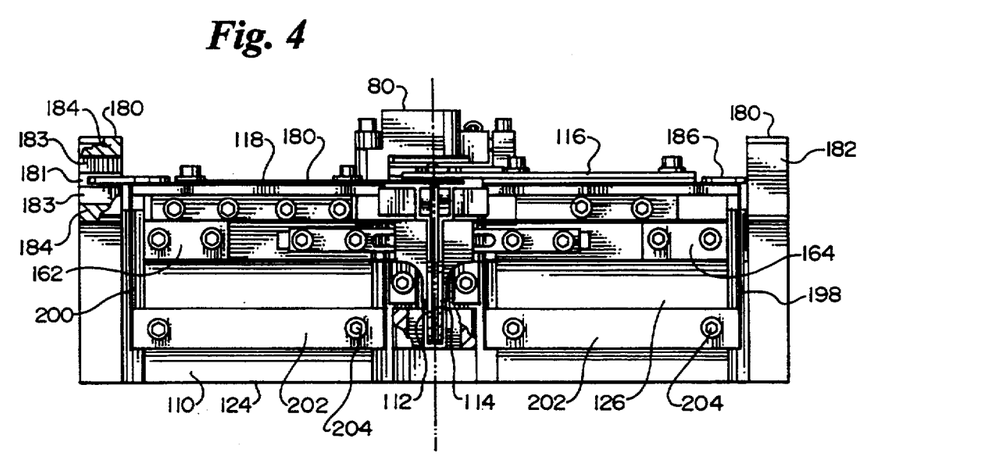
FIG. 4 is a front elevational view of the carrier and base unit of the head gimbal locator.
Figure 10:
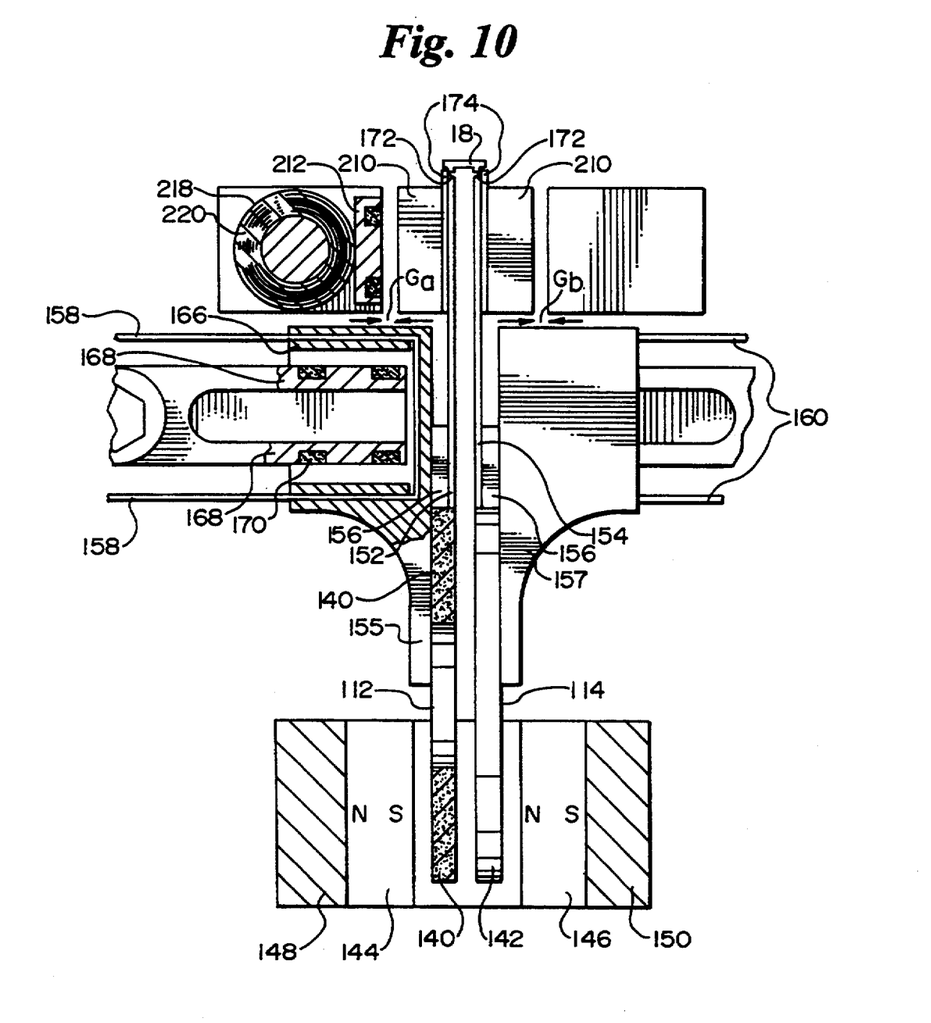
FIG. 10 is a front sectional view of the base unit showing the vertical coils, the vertical position sensors, the overturning moment sensor, and the spreader coils.

Referring to FIGS. 1 and 4, base unit 42 is comprised of five main components: base block 110, left vertical servo assembly 112, right vertical servo assembly 114, load arm servo assembly 116, head servo assembly 118, and overturning moment detector 120 (best depicted in FIG. 10).

Base block 110 is preferably square in plan form, having rectangular shaped sides and is preferably formed of a single metallic block. Base block 110 is precision formed such that top surface 122 and bottom surface 124 are parallel to very close tolerances and that front face 126 is very closely toleranced to being perpendicular to both top surface 122 and bottom surface 124. A central carrier channel 128 is formed in top surface 122 extending from front face 126 to rear face 130 of base block 110. Carrier channel 128 is formed to permit carrier 40 to slide within carrier channel 128 with a minimum of lateral play therein. A stop pin 129 in channel 128 limits the forward travel of carrier 40 in the Y direction.

Figure 5:
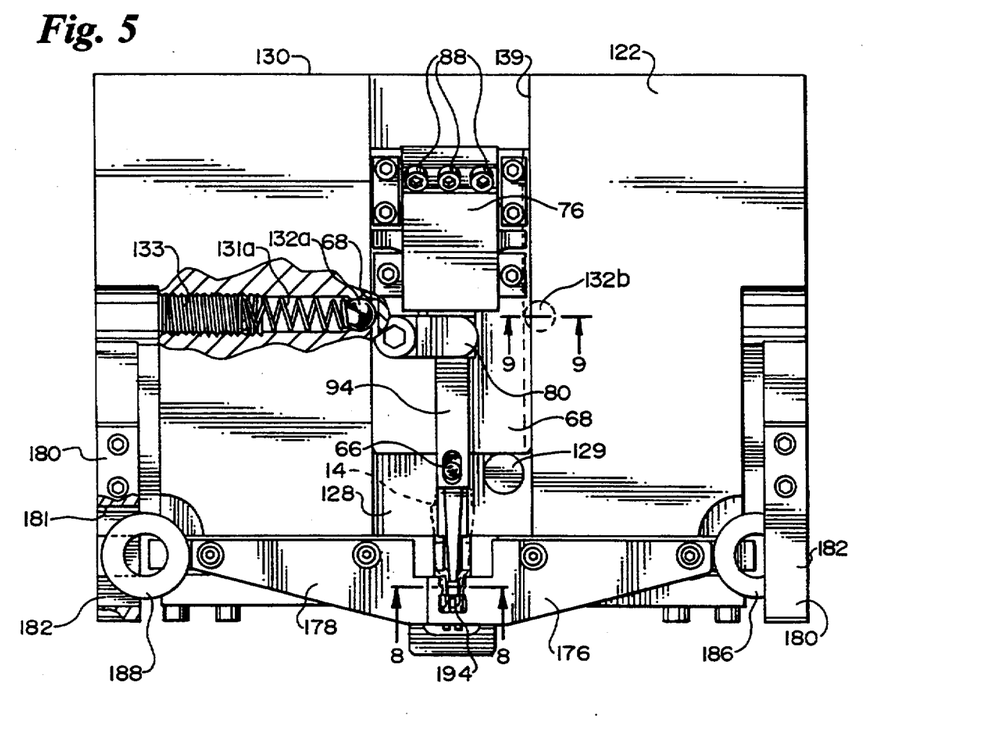
FIG. 5 is a top elevational view of the carrier and base unit of the head gimbal locator with a portion cut out to show the left spring loaded ball bearing and with the load arm shown in phantom.
Figure 9:
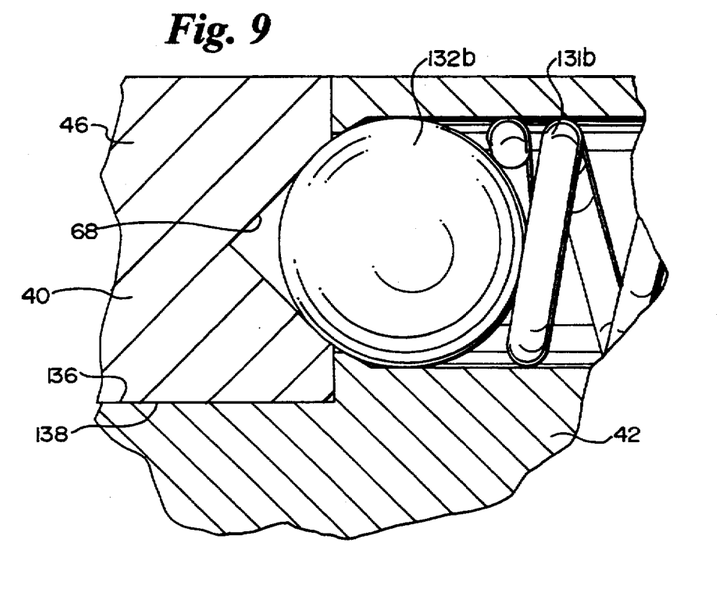
FIG. 9 is an enlarged perspective of the left spring loaded ball bearing positioned in the groove of the carrier base taken along line 9—9 in FIG. 5.

Referring to FIGS. 5 and 9, spring loaded ball bearings 132a and 132b are contained in bores within base block 110 and project into the sides of carrier channel 128. The two ball bearings 132a and 132b oppose one another across carrier channel 128. Ball bearings 132a and 132b engage V shaped grooves 68 formed in the sides of carrier 40 and act to locate carrier 40 within carrier channel 128 and to firmly engage the underside 136 of carrier 40 with the bottom 138 of carrier channel 128. The left V shaped groove 68 may also be viewed by referring to FIG. 7. Ball bearing 132a has an adjustment screw 133, such that the tension on spring 131a of ball bearing 132a can be adjusted relative to the fixed tension on spring 131b of ball bearing 132b. Preferably, the tension on spring 131a is adjusted to exert a force that is greater than the force that is exerted by spring 131b.

Again referring to FIGS. 1 and 4, left vertical servo assembly 112 and right vertical servo assembly 114 are mirror images of one another, spaced apart and facing each other across the centerline, $C_L$, of base block 110. The details of left vertical servo assembly 112 and right vertical servo assembly 114 are best viewed in FIG. 10. Vertical servo assemblies 112, 114 have coils 140, 142. Each coil 140, 142 has its associated permanent magnet 144, 146, respectively. Permanent magnets 144, 146 are spaced apart from the lower portion of coils 140, 142, respectively. The south pole of permanent magnet 144 faces coil 140 and the north pole of permanent magnet 146 faces coil 142. Permanent magnets 144, 146 are bonded to magnetic pole pieces 148, 150 respectively.

A joint is formed around flexure caps 155, 157. This joint is best viewed in FIG. 10. Flexure caps 155, 157 extend from adjacent the upper portion of coils 140, 142 upward to embrace the inward facing end of parallelogram flexures 158, 160. The upper portion of coils 140, 142 are bonded to the lower ends of the flexure caps 155, 157 respectively. The lower end of flexures 152, 154 are bonded to spacers 156 and spacers 156 are bonded to the inward facing side of flexure caps 155, 157 respectively. Parallelogram flexures 158, 160 are embraced by and bonded to the outward facing portions of flexure caps 155, 157 respectively. Parallelogram flexures 158 and 160 function to detect the position of coils 140, 142, respectively. The flexure caps 155, 157 act to form solid joints at the lower inward facing corners of parallelogram flexures 158, 160 that bond the parallelogram flexures 158, 160 to spacers 156, vertical flexures 152, 154, coils 140, 142, respectively. Accordingly, motion of coil 140 in the vertical direction is transmitted via flexure cap 155 to displace vertical flexure 152 and spacer 156 and thence to be sensed by parallelogram flexure 158.

The displacing motion described above acts to change the shape of parallelogram flexure from its normal rectangular shape to a four sided figure having the vertical ends parallel and the longer top and bottom distorted to form a somewhat S-shaped curve. The joint just described, additionally provides the support for the upward projecting vertical flexures 152, 154 and for the downwardly depending coils 140, 142. Coils 140, 142 then, are suspended from flexure caps 155, 157 to a position adjacent permanent magnets 144, 146, respectively and not in contact therewith.

Referring to FIG. 4, parallelogram flexures 158, 160 are formed of slender ribbons of metallic material, preferably berylium copper, in a generally rectangular form. Parallelogram flexures 158, 160 are anchored by anchors 162, 164 to front face 126 of base block 110. Anchors 162, 164 are located at the outward directed end of parallelogram flexures 158, 160 opposite from the portion of parallelogram flexures 158, 160 that are bonded to vertical flexures 152, 154. Accordingly, the outward most end of parallelogram flexures 158, 160 are held rigidly and the inward end is free to translate with the motion of vertical flexures 152, 154.

Referring again to FIG. 10, a ferrite chip 166 is bonded to the upper end portion of the metallic strip forming parallelogram flexures 158, 160. Ferrite chips 166 are bonded approximate the inward end of parallelogram flexures 158, 160. Adjacent each ferrite chip 166 is a ferrite cup core 168 within integral winding 170.

The cup cores 168 are spaced slightly apart from the ferrite chips 166. Distortion of the parallelogram flexures 152, 160 from the rectangular shape changes the spacing between cup cores 168 and ferrite chip 166.

Figure 8:
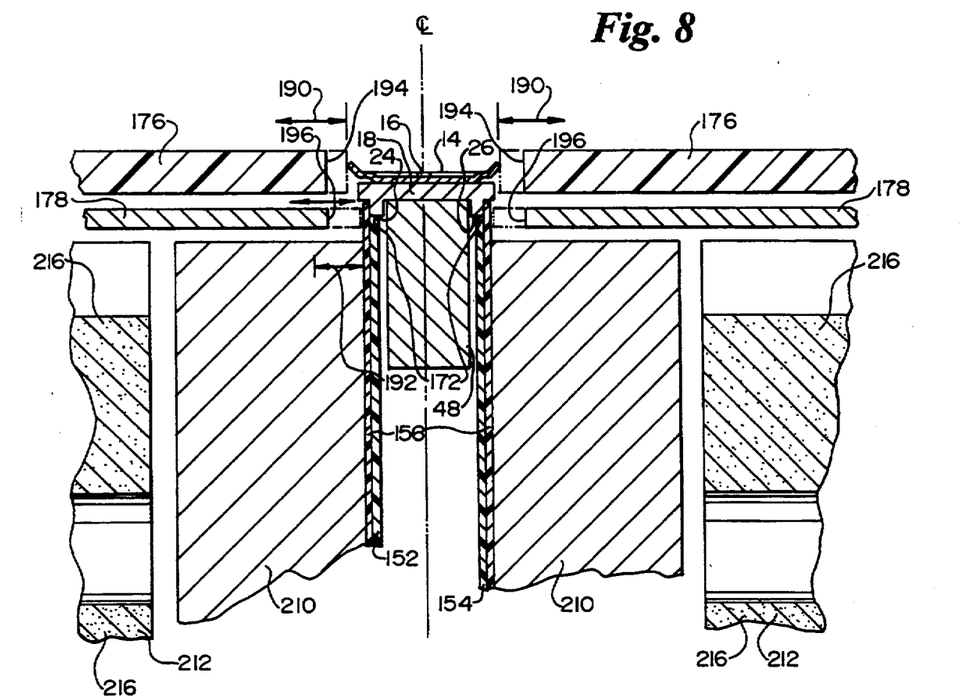
FIG. 8 is an enlarged view of the load arm, gimbal, and the head in position within the head gimbal locator prior to the force measuring operation taken along line 8—8 in FIG. 5.

The two vertical flexures 152, 154 extend upward in a parallel, spaced apart relationship. The vertical flexures 152, 154 are spaced apart a distance that is slightly less than the width of the head 18. Vertical flexure 152 extends upward to engage the underside of air bearing surface 24 and vertical flexure 154 extends upward to engage the underside of air bearing surface 26. The upper tip 172 of vertical flexures 152, 154 is beveled at a 15° angle, as best depicted in FIG. 8. The beveling of upper tips 172 is at a 15° angle slanted inward toward the center line $C_L$ of base unit 42. A head constrainer 174 is bonded to the outer surface of vertical flexures 152, 154. Head constrainer 174 extends upward beyond upper tip 172 such that when upper tip 172 engages the underside of the air bearing surfaces 24, 26 head constrainers 174 will engage the side of head 18.

Load arm servo assembly 116 and head servo assembly 118 are best viewed in FIGS. 1 and 4. The construction of load arm servo assembly 116 and head servo assembly 118 are very similar and would be identical except that load arm positioner 176 of load arm servo assembly 116 overlies head positioner 178 of head servo assembly 118. Actuation of load arm servo assembly 116 and head servo assembly 118 is provided by electromagnetic means similar to that which actuates vertical flexures 152, 154. Accordingly, brackets 180 have apertures 181 mounting spaced apart opposed magnetic units 128. Magnetic units 182 each contain permanent magnets 183 and pole pieces 184 similar to permanent magnets 144 and pole pieces 148. Coils 186, 188 are associated with load arm servo assembly 116 and head servo assembly 118 respectively. Coils 186,188 are suspended between and spaced apart from the respective opposed magnetic units 182.

Coils 186, 188 are connected to load arm positioner 120 and head positioner 122, respectively. Load arm positioner 120 and head positioner 122 are so restrained to permit one degree of freedom motion laterally in the X direction across front face 126 of base block 110. Referring to FIG. 8, the lateral motion of load arm positioner 120 as indicated by arrows 190. In the lateral motion of head positioner of 178 is indicated by arrows 192. As best viewed in FIGS. 5 and 8, notch 194 cut out in load arm positioner 176, extends on either side of tip 22 of load arm 14 and is capable of laterally displacing tip 22 in the X direction. Notch 196 is cut out of head positioner 122 and extends on either side of head 18. Notch 196 is free to abut head constrainer 174. Accordingly, head positioner 178 is able to displace head 18 laterally in the X direction by exerting a force on head constrainer 174. Load arm positioner 176 and head positioner 178 are spaced apart from one another vertically such that they move independently without the generation of friction therebetween.

Load arm servo assembly 116 and head servo assembly 118 each have an associated parallelogram flexure 198 and 200, respectively. Parallelogram flexure 198 is shown in bold in FIG. 4 to better indicate its positioning. The bottom horizontal side of parallelogram flexure 198, 200 is anchored to front face 126 of base block 110. This anchoring is provided by brackets 202 and bolts 204. Load arm positioner 176 and head positioner 178 are bonded to and supported by the upper side of parallelogram flexure 198, 200, respectively. Parallelogram flexure 198, 200 are constructed of thin metallic strips, preferably berylium copper. The upper horizontal side of parallelogram flexure 198, 200 is free to translate in the X direction along with load arm positioner 176 and head positioner 178.

A ferrite chip (not shown) is bonded to the inner face of the top horizontal side of parallelogram flexure 198 and 200. A ferrite cup core (not shown) is mounted to front face 126 of base block 110. The cup core is mounted adjacent to and spaced slightly apart from the ferrite chip. The ferrite chip and the cup cores are disposed similarly to the previously described ferrite chips 166 and cup cores 168. Accordingly, horizontal motion of load arm positioner 176 and head positioner 178 changes the shape of parallelogram flexures 198, 200, respectively. The changed shape changes the space between the ferrite chip and the cup core.

The overturning moment detector 120 is best depicted in FIGS. 8 and 10. To provide detection of the overturning moments, ferrite chips 210 are bonded to the outward facing surface of spacers 156. Ferrite chips 210 are free to translate in the X direction when vertical flexures 152, 154 are displaced in the X direction is a function of an overturning moment. The following are not shown, but are similar in construction and function to ferrite chips 166 and cup cores 168 depicted in FIG. 10. A ferrite cup core 212 is mounted to front face 126 of base block 110 in a position facing each of the ferrite chips 210. The ferrite cup core 212 are spaced slightly apart from ferrite chips 210 leaving an air cap therebetween. The ferrite cup core 212 is comprised of a permanent magnet cup 214 with integral coil 216.

Spreader solenoid 218 is integrated into overturning moment detector 120. Spreader solenoid 218 is comprised of a coil 220 acting in conjunction with ferrite chip 210. Coil 220 is oriented at 90° to coil 216 that functions are part of the overturning detector 120. Each overturning moment detector 120 has a spreader solenoid 218 integrated therein to act to spread the vertical flexures 152, 154. Energizing solenoid coil 220 exerts an attracting force on ferrite chip 210 and thereby on vertical flexures 152, 154.

In operation as depicted in FIG. 7, load arm 14, gimbal 16 and head 18 are mounted on carrier 40. Clamp lever retainer 80 is opened and Z height spacer 94 and head clamp lever 76 are pivoted in their upward position. This pivoting motion clears Z height spacer 94 of load arm locating pin 66. Load arm 14 has an aperture in its base that is slipped over load arm locating pin 66. This action brings load arm 14 into contact with Y position offset flexure 69 and load arm clamp spring 100. Head 18 is positioned on the upper surface of nose piece 48. Gimbal 16 is mounted on top of head 18 and a portion of uncured bonding material is applied at the juncture between gimbal 16 and head 18. Gimbal 16 rests beneath tip 22 of load arm 14. The Y dimension of head 18 from load arm locating pin 66 is fixed by Y position offset flexure 69. To fix this dimension, the rear side of head 18 is brought into contact with Y position offset flexure 69.

When load arm 14 is thus positioned about load arm locating pin 66, Z height spacer 94 is pivoted into position about load arm locating pin 66 on top of load arm 14. Clamp lever 76 is rotated into its loaded horizontal position. This action compresses clamp spring 84 forcing Z height spacer 94 into contact with carrier base 46 at contact pads 96. Once clamp lever 76 is in its loaded position, clamp lever retainer 80 is moved to its closed position, thereby retaining clamp lever 76 in its loaded position. This action forces Z height spacer 94 downward clamping load arm 14 between the underside of Z height spacer 94 and load arm clamp spring 102.

Once load arm 14, gimbal 16 and head 18 are loaded on carrier 40 as indicated, carrier 40 is ready for mounting on base unit 42. Carrier 40 is typically slipped into carrier channel 128 at the rear of carrier channel 128. Carrier 40 is then slid forward in carrier channel 128. As carrier 40 is moved forward, grooves 68 engage ball bearings 132a, 132b. Spring loads acting on ball bearings 132a and 132b force carrier 40 downward against bottom 138 of carrier channel 128. A greater spring load on ball bearing 132a than on ball bearing 132b forces carrier 40 to the right against right wall 139 of carrier channel 128. Carrier 40 is slid forward until it contacts stop pin 129.

Figure 11:
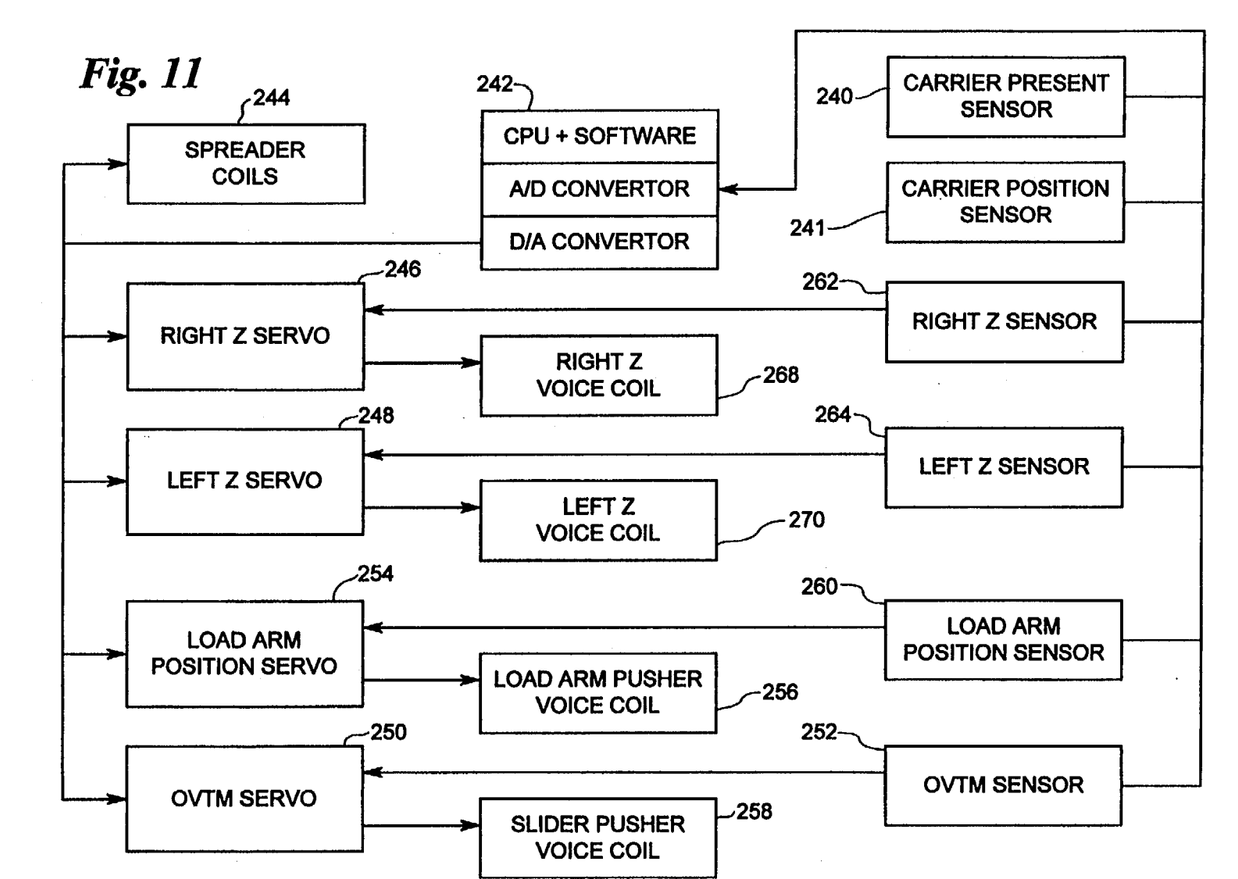
FIG. 11 is an operational control flow diagram of the controller that controls the head gimbal locator.

The operational control flow diagram is depicted in FIG. 11. As carrier 40 is advanced toward stop post 129, A carrier present signal is generated at 240 and a carrier position signal is generated at 241. Coils 140, 142 are energized such that they act to pull vertical flexures 152, 154 downward in the Z direction. Additionally, coils 220 are energized. Energizing coils 220 creates a magnetic force acting on ferrite chip 210 that draws ferrite chip 210 toward spreader solenoid 218. This motion in the X direction spreads vertical flexures 152, 154. With vertical flexures 152, 154 being both spread apart and lowered, carrier 40 can be advanced against stop post 129 and head 18 will be positioned between flexures 152, 154. When head 18 is in position, the power to coil 220 is removed and the power coils 140, 142 are removed. Commands are directed by controller 242 to the spreader coils 244 and to the left and right servos 246, 248. This causes flexures 152, 154 to move inward and upward embracing the sides of head 18 and the underside of air bearing surfaces 24, 26. This defines the initializing position from which load arm 14 and head 18 can be positioned relative to one another to achieve desired flight height of head 18. In a preferred embodiment, coils 200 are energized to the point that ferrite chip 210 snaps open. The current required to cause the snapping open is measured using overturning moment detector 120. This current level is retained in memory by the controller. Slightly less current is then imposed so that flexures 152, 154 spread to admit head 18, but do not snap open.

The target values for the differential gram loading of air bearing surface 24 and air bearing surface 26 are entered into the computer 242 that controls head gimbal locator 10. Such values include, for example, a total downward force of 3.5 plus or minus 0.5 grams exerted by load arm 14. A second command, for example, is in all cases in which the total gram load is greater than 3.0 grams, the differential gram load on air bearing surface 24, 26 shall be 8% of the total gram load with air bearing surface 24, the active air bearing surface, bearing the greater load. A third command for example, is in all cases in which the total gram load is less than 3.0 grams, the load on air bearing surface 24 shall be 1.5 grams. This third command would require that with a decreasing total gram load, the head 18 be tilted ever increasingly toward air bearing surface 24 in order to ensure that air bearing surface 24 maintains a 1.5 gram load. The ability to adjust head 18 as precisely as indicated in these instructions is unique to the present invention.

Coils 140, 142 are then energized, raising vertical flexures 152, 154. Vertical flexures 152, 154 are engaged with the underside of air bearing surfaces 24, 26 respectively, and thereby raise head 18, gimbal 16 and load arm 14 off of nose piece 48. At this point, HGA is supported at the proper Z height only by flexures 152, 154 and at the point of load arm locating pin 66. In a preferred embodiment, certain limits on differential gram loading on air bearing surfaces 24, 26 are provided. These limits are outside of the differential gram loading that occurs when head 18 is properly positioned and are used to indicate that head 18 is cocked in an abnormal position. Repositioning head 18 on carrier 40 is then required.

In the configuration described above, the differential gram measurement sequence can begin. The overturning moment detector 120 is first energized by a command depicted at 250. When an overturning moment, shown in F4 in FIG. 2, is present, it creates a rotational force acting on head 18 to move head 18 in the X direction either left or right. If no overturning moment is present, head 18 will remain exactly centered. Referring to FIG. 10, the overturning moment detector 120 detects the overturning moment of the side force of load arm 14 by measuring the defection in the X direction of the vertical flexures 152, 154 which support head 18 at the outer corner of the air bearing surfaces 24, 26. This detection is depicted at 252 in FIG. 11. When air gap $G_a$ equals air gap $G_b$, the impedance of coil A equals the impedance of coil B. The differential voltage of a bridge circuit formed by coil A, coil B, and two resistors then equals zero. The magnitude of the differential voltage is proportional to the difference of $G_a$ minus $G_b$ and the phase relative to a two MHZ carrier signal reverses when the difference in direction between $G_a$ and $G_b$ reverses. Accordingly, displacement in either X direction of head 18 can be measured. OVTM sensor 252 provides this data to computer 242.

The overturning moments, F4, are a result of a number of different factors included the spring effect of load arm 14, and the suspension of load arm 14 about load arm locating pin 66. The overturning moment is removed by applying a damped dither signal to load arm positioner 176. Commands are generated by computer 242 to load arm position servo 254 and to load arm position coil 256 to move load arm 14 and to OVTM servo 250 and head pusher voice coil 258 to hold head 18 in position. A dither signal is a command to generate back and forth motion in the X direction. The dithered motion of load arm positioner 176 is generated by activating coil 186.

Since there are frictional forces in place between load arm 14 and head 18, the motion in the X direction for load arm positioner 176 and head positioner 178 is simultaneous and equal in stroke but opposite in direction. This is done in order to hold head 18 stationary in one position while moving load arm 14 back and forth to cancel out the affects of the overturning moments. The overturning moment detector 120 continues to detect when head 18 is absolutely centered. The dither is decayed, in that the length of stroke on successive motions is decreased to a point where load arm positioner 176 and head positioner 178 gradually come to a halt. At this point, the load arm 14 is absolutely centered with respect to load arm positioner 176. Further, head 18 is absolutely centered, indicating that there are no turning moments. Load arm positioner 176 and head positioner 178 have stopped in a neutral position such that they are not touching load arm 14 or head 18 respectively.

In a preferred embodiment, load arm positioner 176 is moved first to the left and then to the right until load arm positioner 176 is just touching load arm 14. When load arm positioner 176 touches load arm 14, head 18 moves very slightly. This motion is enough to be detected and thereby to determine the position of head 18. The position of the head 18 is determined as detected by overturning moment detector 120 shown at 252 in FIG. 11. The distances moved by load arm positioner 176 to touch load arm 14 are held in memory by the controller and this is used to more accurately set the initial dither stroke for the given load arm 14. This better allows HGL 10 to accommodate varying sizes of load arms 14 and heads 18.

At this point, measurements are made of the normal force on air bearing surface 24, 26. Head 18 is held on a perfectly level condition by vertical flexures 152, 154. This is accomplished through use of a feedback system. Parallelogram flexures 158, 160 detect when the forces on air bearing surfaces 24, 26 move flexures 152, 154 out of the level position as indicated at 262 and 264 in FIG. 11. Motion of flexures 152, 154 distorts parallelogram flexures 158, 160. This distortion is detected by ferrite chips 160 and cup core 168 as the airgap therebetween changes. The coil impedance of cup core 168 is a function of the air gap between cup core 168 and winding 170. The air gap changes as parallelogram flexures 158, 160 are distorted as a function of the motion of vertical flexures 152, 154 respectively. Upon sensing motion in vertical flexures 152, 154, current in coils 140, 142 is altered to bring vertical flexures 152, 154 back to the position in which head 18 is absolutely level as indicated at 268, 270 in FIG. 11. The basic force equation is F equals KBIi. Beta equals the air gap flux density, l equals the active wire length, i is the coil current and K is a numerical constant that provides for the correct system of units. Force, which is the differential gram loading, is a function of the current required to hold the head 18 level. Once vertical flexures 152, 154 are in the position in which head 18 is held absolutely level, the current in coils 140, 142 is directly related to the force required to hold head 18 in the level position.

When the normal force of measurements have been made as indicated above, the sum of the normal force (the total gram load) and differential between the two normal force measurements (the differential gram load) are calculated. The calculated force differential is compared to the target differential that is desired to achieve the proper flight height of air bearing surface 24. Corrections are made by holding head 18 level and centered in the X dimension while moving load arm 14 in the X dimension to achieve a differential gram loading that is close to the target gram loading. This is accomplished by activating load arm servo assembly 116 and head servo assembly 118. A precalculated amount of movement in the X direction will be applied to load arm 14. The distance is sensed by parallelogram flexure 198 while parallelogram flexure 200 senses that head 18 is retained in its center location. For example, if load arm 14 is to be moved to the left, head positioner 178 will move to the right to abut the left side of head 18. Load arm positioner 176 will move to the left contacting the right side of load arm 14 and continued to move to the left displacing load arm 14 the desired distance in the X direction.

Once load arm 14 has been displaced the desired dimension in the X direction, the controller commands the system to run a second series of functions that apply the previously described dither to the load arm 14 and head 18 to remove any overturning moments that were generated by displacing load arm 14. After again neutralizing the overturning moment, the differential gram measurements are again made utilizing vertical flexures 152, 154. This series of events will be repeated a fixed number of times until the delta gram force measured on head 18 is within the target limits set into the controller. When the desired differential gram loading is achieved, an ultraviolet lamp is activated, causing the bonding material to set in a conventional manner.

Although a certain specific embodiment of the present invention has been shown and described, it is obvious that many modifications and variations thereof are possible in light of the teachings. It is to be understood therefore that within the scope of the appended claims, the invention may be practiced otherwise than as specifically described herein.

What is claimed is:

1. Apparatus for positioning a transducer head with respect to a supporting arm, the transducer head being subject to a normal force and a moment force and having first and second air bearing surfaces, comprising:

controller means for controlling the positioning of the transducer head with respect to the supporting arm having data input ports for receiving external parameters, sensor data input ports for receiving data from sensors, command output ports for outputting commands generated based on the external parameters and the sensor data;

first and second sensor means for detecting the overturning moment and being adapted for providing data representative of the overturning moment to the controller means;

first actuator means for varying the position of the load arm and being adapted for responding to commands from the controller means;

second actuator means for varying the position of the transducer head and being adapted for responding to commands from the controller means, the first and second actuator means acting in concert to negate the overturning moment;

third sensor means for detecting the position of the first air bearing surface with respect to a known level reference and being adapted for providing data representative of the sensed position of the first air bearing surface to the controller means;

third actuator means for positioning the first air bearing surface of the transducer head and being adapted for responding to commands from the controller means;

fourth sensor means for detecting the position of the second air bearing surface with respect to a known level reference and being adapted for providing data representative of the sensed position of the second air bearing surface to the controller means;

fourth actuator means for positioning the second air bearing surface of the transducer head and being adapted for responding to commands from the controller means;

the controller means calculating the total normal force on the transducer head and the differential force load on the respective air bearing surfaces and generating commands to the first and second actuator means to position the transducer head responsive thereto to achieve a desired differential force loading on the first and second air bearing surfaces.

2. Apparatus for positioning a transducer head with respect to a supporting arm, the transducer head being subject to a normal force and having first and second air bearing surfaces, comprising:

a first force balance means for sensing a displacement of the first air bearing surface from a predetermined position as a result of the normal force and generating a countering force necessary to reposition the first air bearing surface to the predetermined position, a second force balance means for sensing a displacement of the second air bearing surface from a predetermined position as a result of the normal force and generating a countering force necessary to reposition the second air bearing surface to the predetermined position, positioning means for positioning the load arm with respect to the transducer head to distribute the normal force between the first air bearing surface and the second air bearing surface to achieve a desired differential force loading of the first air bearing surface and the second air bearing surface.

3. A method of positioning a transducer head with respect to a supporting arm, the transducer head being subject to a normal force and having first and second air bearing surfaces, comprising:

sensing a displacement of the first air bearing surface from a predetermined position as a result of the normal force;

generating a countering force necessary to reposition the first air bearing surface to the predetermined position;

sensing a displacement of the second air bearing surface from a predetermined position as a result of the normal force;

generating a countering force necessary to reposition the second air bearing surface to the predetermined position;

positioning the load arm with respect to the transducer head to distribute the normal force between the first air bearing surface and the second air bearing surface to achieve a desired differential force loading of the first air bearing surface and the second air bearing surface.

4. A method for positioning a transducer head with respect to a supporting arm, the transducer head being subject to a normal force and a moment force and having first and second air bearing surfaces, comprising:

controlling the positioning of the transducer head with respect to the supporting arm with a controller having data input ports for receiving external parameters, sensor data input ports for receiving data from sensors, command output ports for outputting commands generated based on the external parameters and the sensor data;

detecting the overturning moment and providing data representative of the overturning moment to the controller;

varying the position of the load arm and varying the position of the transducer head in concert to negate the overturning moment;

detecting the position of the first air bearing surface with respect to a known level reference and providing data representative of the sensed position of the first air bearing surface to the controller means;

positioning the first air bearing surface of the transducer head;

detecting the position of the second air bearing surface with respect to a known level reference and being adapted for providing data representative of the sensed position of the second air bearing surface to the controller means;

positioning the second air bearing surface of the transducer head and being adapted for responding to commands from the controller means;

calculating the total normal force on the transducer head and the differential normal force on the respective air bearing surfaces; and generating commands to position the transducer head responsive to the normal force on the transducer head and the differential normal force on the respective air bearing surfaces to achieve a desired differential force loading on the first and second air bearing surfaces.

5. A head gimbal locator for positioning a head having a plurality of air bearing surfaces on a load arm to achieve a desired flight height of a selected air bearing surface when the head is in operation relative to a magnetically coated disc, the head gimbal locator including:

measurement means for measuring the total normal force on the head and the differential normal force on each air bearing surface: and positioning means for positioning the head with respect to the load arm as a function of the total normal force on the head and the differential normal force on each air bearing surface.

6. A method of positioning a head having a plurality of air bearing surfaces on a load arm to achieve a desired flight height of a selected air bearing surface when the head is in operation relative to a magnetically coated disc, the method including the steps of:

measuring the total normal force on the head and the differential normal force on each air bearing surface: and positioning the head with respect to the load arm as a function of the total normal force on the head and the differential normal force on each air bearing surface.

* * * * *